United States Patent [19]

Glaser-Inbari

[11] 4,175,844

[45] Nov. 27, 1979

[54] OPTICAL IMAGING SYSTEM

[75] Inventor: Isaia Glaser-Inbari, Tucson, Ariz.

[73] Assignee: Yeda Research & Development Co. Ltd., Rehovot, Israel

[21] Appl. No.: 925,563

[22] Filed: Jul. 17, 1978

Related U.S. Application Data

[63] Continuation-in-part of Ser. No. 733,194, Oct. 8, 1976, abandoned.

[30] Foreign Application Priority Data

Oct. 19, 1975 [IL] Israel .................................. 48318/75

[51] Int. Cl.² .............................................. G03B 35/00
[52] U.S. Cl. ..................................... 354/110; 354/229
[58] Field of Search ............... 354/110, 115, 118, 123, 354/229; 350/167

[56] References Cited

U.S. PATENT DOCUMENTS

| Re. 28,162 | 9/1974 | Anderson | 354/229 X |
|---|---|---|---|
| 3,447,438 | 6/1969 | Kaufer et al. | 350/167 X |
| 3,459,111 | 8/1969 | Cooper | 354/123 |
| 3,950,769 | 4/1976 | Yevick | 354/115 |

OTHER PUBLICATIONS

Brook, R., *Pinhole Camera*, In British Journal of Photograph, vol. 11, pp. 244, 245, Mar. 18, 1977.

*Primary Examiner*—John Gonzales
*Attorney, Agent, or Firm*—Browdy and Neimark

[57] ABSTRACT

An optical apparatus for producing a relatively large image with a relatively small distance between the apparatus and an image plane, includes a surface distribution of lenslets of a size not substantially larger than the smallest size resolvable by the unaided human eye and disposed on the focal plane of the lenslets, the pinholes defining a plurality of discrete light transmission paths, arranged with respect to the lenslets such that each path transmits light representing a different portion of the image produced by each of the lenslets to the image plane. Photosensitive film is held at the image plane and the image plane is displaced a sufficient distance from the focal plane to permit distribution of the light passing through each pinhole onto an area about the size of a lenslet. The sum of the contributions of each of the light paths produces a completed image on the image plane.

20 Claims, 4 Drawing Figures

OPTICAL IMAGING SYSTEM

CROSS-REFERENCE TO RELATED APPLICATIONS

The present application is a continuation-in-part of U.S. Ser. No. 733,194, filed Oct. 8, 1976, now abandoned, the entire contents of which are hereby incorporated by reference.

FIELD OF THE INVENTION

The present invention relates to optical devices and more particularly concerns optical imaging apparatus for producing an image on an image plane and a camera utilizing such apparatus.

BACKGROUND OF THE INVENTION

In the design of compact optical instruments such as cameras a primary goal is the minimization of the required distance between an objective lens and an image focal plane while maximizing the size of the image produced thereon. Various types of single lenses and lens combinations have been designed in an attempt to achieve this goal but these suffer from the drawback of relatively high cost and the introduction of significant distortion in the produced image. One example of a prior art lens combination is disclosed in U.S. Pat. No. 3,784,277.

Lenslet arrays are well known in the art for producing an array of small images. It is also known in the art from U.S. Pat. Nos. 3,459,111 and 3,950,769, to use a lenslet array and an aperture mask to produce a dissected image on photosensitive film held at the plane of the aperture mask. When the procedure is reversed and the image on the film is illuminated from the rear and projected onto a viewing screen the image is reconstructed. The purpose of such a system is to produce a plurality of composite images on a single frame of photosensitive materials. This is possible because the film is in the plane of the aperture mask and it necessitates the use of apertures large enough to be resolved by the film.

Such lenslet arrays have hitherto not been proposed for use in solving the above problem of maximizing image size while minimizing the required separation of the lens from the image plane, producing a directly viewable image without the necessity of decoding or projection, due to the fact that they produce a plurality of small images rather than a single large image.

SUMMARY OF THE INVENTION

In accordance with the present invention there is provided optical apparatus for producing a relatively large image with a relatively small distance between the front of the apparatus and an image plane. A surface distribution of lenslets in a predetermined arrangement is disposed intermediate an object and an image plane. A sampling means is disposed substantially in the focal plane of the lenslets. The sampling means defines a plurality of discrete light transmission paths which are arranged with respect to the disposition of the plurality of lenslets, with or without presence of additional lenses, such that each path transmits light representing a different portion of the image produced by each of the lenslets to the image plane. Image plane means holds photosensitive material at the image plane which is at a sufficient distance from the sampling means to allow each light transmission path to be distributed onto an area approximately equal to the area of a single lenslet. The sum of the contributions of each light path produces a completed image on the image plane.

According to one embodiment of the present invention, a multiplicity of lenslets, each having a relatively short focal length, are arranged intemediate an object and an image plane, preferably in a periodic planar array. Each individual lenslet produces a small image. Each light transmission path of the sampling means transmits to the image plane a different portion of a corresponding small image. The sampling means preferably comprises a mask having thereon a pinhole array of periodicity slightly different from that of the lenslet array. Combination of the contributions of the individual pinholes produces a large image on the image plane.

According to alternative embodiments of the present invention, the lenslet array may be non-planar and random instead of periodic. In such cases the disposition and operation of the sampling means are designed to produce a combined image on the image plane similar to that produced in accordance with a preferred embodiment of the invention described above.

Further in accordance with another embodiment of the present invention, there is provided a "thin" camera comprising a lenslet array and sampling means as described above, light responsive photographic film disposed in the image plane and a shutter disposed intermediate the sampling means and the image plane.

A controlled amount of distortion may be introduced by the mechanism of the camera by altering the periodicity of lenslets forming the lenslet array or the pinholes in the pinhole array sampling means. The introduction of such small distortion may be useful in document reproducing cameras where it is necessary to overcome distortions introduced by reproducing apparatus or in the original being photographed.

In accordance with a further embodiment of the present invention there is provided a scanning camera in which a single dimension lenslet array and a single dimension pinhole array are disposed in parallel spaced relationship and move transversely to their axis at slightly differing velocities thereby producing a combined image on the film.

In accordance with a variation of the scanning camera described above, the one dimensional lenslet array and pinhole array may be maintained while both the film and the object move. The image thus produced indicates the change in object position with time.

In a further embodiment of the present invention the periodicity of the pinholes in the aperture mask is identical to that of the lenslets and a single large simple lens is disposed in front of the lenslet array. This arrangement permits the use of larger pinholes and a greater tolerance in the quality of imaging required from each lenslet.

Details of the present invention are set forth in a paper co-authored by the present inventor entitled "Imaging by Sampling" appearing at pages 467–478 of *Applications of Holography and Optical Data Processing*, edited by E. Marom and A. A. Friesem, Pergamon Press, Oxford and New York, 1977. The entire contents of this paper are hereby incorporated by reference.

The invention will be more fully understood and appreciated from the following detailed description taken in conjunction with the drawings in which:

DETAILED DESCRIPTION OF PREFERRED EMBODIMENTS

Figure 1:
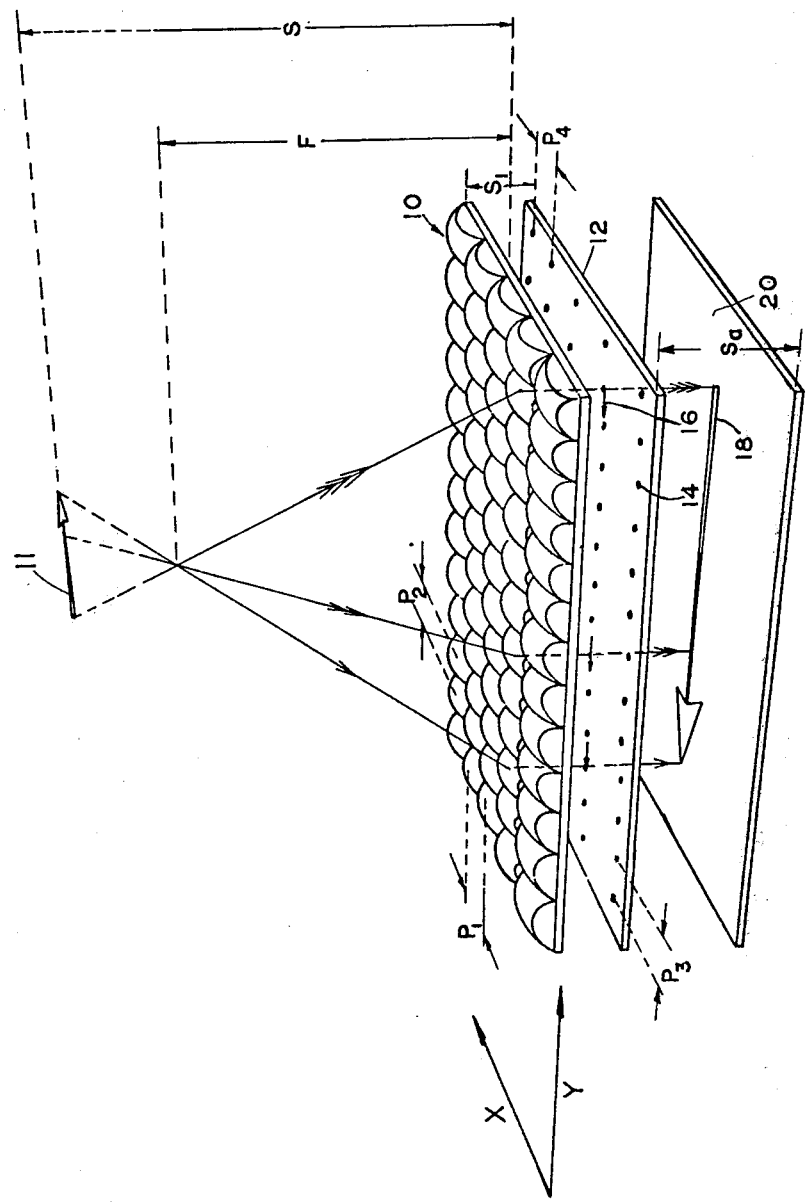
FIG. 1 is a perspective view of the optical apparatus of an embodiment of the present invention disposed between an object and an image plane.

Referring to FIG. 1 there is shown a lenslet array 10 disposed in the XY plane facing an object 11 and containing a multiplicity of lenslets having a periodicity of $P_1$ in the X direction and a periodicity of $P_2$ in the Y direction. Preferably, $P_1$ and $P_2$ are selected to be identical and to be approximately 0.2 mm such that the separation between adjacent lenslets is just below the resolution limit of the human eye. When identical, $P_1$ and $P_2$ are hereafter referred to as $P_a$. The periodicity should not be substantially larger than the smallest size resolvable by the unaided human eye which is about 0.2 mm. If larger than about 0.3 mm, for example, the resulting image produced by such a camera would be inadequately sharp for most applications. Preferred periodicity is between 0.16 and 0.33 mm, most preferably about 0.2 mm.

It is to be understood that the lenslet array illustrated in FIG. 1 is merely exemplary of a wide variety of lenslet arrays which may be usefully employed in accordance with embodiments of the present invention. For example, planar lenslet arrays having periodicities $P_1$ and $P_2$ along respective perpendicular X and Y axes which differ from each other may be employed or a known random periodic distribution of lenslets may alternatively be used. The lenslet array need not necessarily be arranged in a plane but may instead be disposed along any known surface. Furthermore, the size and periodicity of the lenslets may be varied to suit differing applications.

Lenslet array 10 is typically formed of plastic, molded to define a multiplicity of convex lenslet surfaces. The precise configuration of the individual lenslet may be varied to suit design and manufacturing criteria. Any array arrangement such as rectangular, hexagonal or triangular may be used.

A mask 12 bearing a pinhole array is disposed generally parallel to lenslet array 10 and in light receiving relationship therebehind. The separation between lenslet array 10 and mask 12, indicated as $S_1$, is related to the focal length f of each individual lenslet by the following equation:

$$S_1 = (f \cdot S)/(S-f)$$

where S is the distance separating object 11 from lenslet array 10. Normally, as S is much larger than f, f may be taken as a good approximation to $S_1$. Thus where f, the focal length of each lenslet, is selected to be 1 mm, $S_1$ is selected to be also 1 mm.

Pinholes 14 are distributed on mask 12 with a periodicity $P_3$ along the Y axis and a periodicity $P_4$ along the X axis, which are preferably identical, and which differ slightly from the periodicity of the lenslets in array 10. When identical, $P_3$ and $P_4$ will hereinafter be referred to as $P_b$.

The size of the pinhole should be directly proportionate to the size of the individual lenslet and the size of the entire array. The width of each pinhole is the same proportion to the width of each individual lenslet as the width of each individual lenslet is to the width of the entire lenslet array. The same holds true for the length of each pinhole. Similarly, the periodicity $P_3$ and $P_4$ will differ from $P_1$ and $P_2$ in an amount which depends upon the number of lenslets in the entire array. The periodicity can be calculated as $$P_3 = P_2[(y+1)/y]$$

where y is the number of lenslets in the Y direction of the array, and $$P_4 = P_1(P_3/P_2)$$

where the number of lenslets in the X direction of the array is assumed to be no larger than y above.

According to the general embodiment of the present invention described above wherein the planar lenslet array may have differing periodicities along the X and Y axes, or may contain a random known distribution of lenslets, the positional relationship between the center of each individual lenslet in array 10 and a corresponding pinhole in mask 12 is given by the following quotations:

$$X_i' = X_i(1+e_x)$$

$$Y_i' = Y_i(1+e_y)$$

where $X_i'$ is the position of the i'th pinhole of the X axis, $Y_i'$ is the position of the i'th pinhole along the Y axis, $X_i$ is the position coordinate of the center of the i'th lenslet along the X axis, $Y_i$ is the position coordinate of the center of the i'th lenslet along the Y axis, and $e_x$ and $e_y$ are constants or smooth varying functions which vary no more than about 25%.

The absolute values of $e_x$ and $e_y$ are selected to be small fractions.

Each lenslet in array 10 forms an individual small image 16 in the plane defined by mask 12. One portion of each image is picked up by a pinhole and transmitted. The rest of the light forming the image is blocked. Since the period $P_b$ of the pinhole array on mask 12 is slightly different from period $P_a$ of the lenslet array 10, each pinhole is located at the image area behind each lenslet and in a relative position on said area different from the position of every other pinhole on the image area behind its respective lenslet. With the pinholes thus located, the image components admitted through each of the pinholes to the image represent different portions of the photographic subject. The entire set of transmitted points combines to form a relatively large image 18 on the image plane 20.

The image plane 20 is disposed at a distance $S_2$ from the aperture mask 12 so that the light from each pinhole 14 will be distributed onto an area of the image plane 20 larger than the pinhole itself. The distance $S_2$ is preferably chosen so as to allow a distribution of light from each pinhole onto an area approximately equal to that of a single lenslet. Thus, not just pinhole size portions of the image plane will be exposed, but essentially the entire image plane. Since the area of each lenslet is not substantially larger than the smallest size resolvable by the unaided human eye, and is preferably slightly less than the smallest size resolvable by the unaided human eye, the eye will not be able to detect any blurring of the image due to the separation of the image plane 20 from the focal plane 12 or due to any slight overlap of the image areas from each pinhole. Due to the very small size of the individual lenslets and the minute size of the pinholes the resulting photograph will be quite sharp.

While the distance $S_2$ will be approximately the same as the focal length f of each individual lenslet which in turn is approximately the same as the distance $S_1$, in actuality it will be slightly less than f due to the diffraction effect of the passage of light through a pinhole.

The lenslet array-pinhole mask combination may be appreciated to have an effective focal length given by the following expression:

$$F = (f \cdot P_a)/(P_b - P_a)$$

where $P_a$ is the periodicity of the lenslet array and $P_b$ is the periodicity of the pinhole array and f the focal length of an individual lenslet.

According to an alternative embodiment of the invention, mask 12 need not comprise a pinhole array but may instead by any type of device which provides an array of discrete light transmission paths.

According to a further alternative embodiment of the invention other types of radiation aside from visible light may be imaged using the apparatus described herein.

Figure 2:
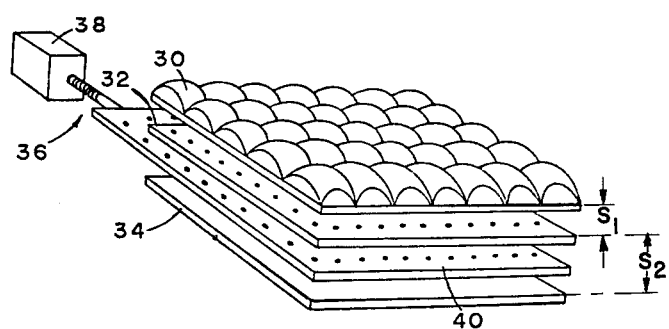
FIG. 2 is a pictorial view of a camera employing the apparatus of FIG. 1.

Referring now to FIG. 2 there is shown a camera employing a lenslet array 30 arranged to receive light from an object. A pinhole mask 32 is disposed generally parallel to array 30 and spaced therefrom by a distance $S_1$ which is selected in the same manner as distance S, discussed hereinabove with respect to FIG. 1. Photographic film 34 of any suitable type and arrangement is disposed at the image behind mask 32. A shutter mechanism 36 is operative to allow selected access of light to film 34 and comprises a driving unit 38 and a pinhole mask 40 disposed intermediate mask 32 and film 34. FIG. 2 shows mask 40 slightly separated from mask 32 for the purpose of illustration but is to be understood that they will preferably be adjacent one another. Mask 40 may be conveniently constructed to have a distribution of pinholes having periodicity identical to that of the pinholes of mask 32. Film 34 is separated from mask 32 by a distance $S_2$ sufficient to allow diffusion of the light transmitted through the pinholes so as to form a smooth image. As discussed hereinabove with respect to FIG. 1, $S_2$ may be conveniently selected to be approximately equal to $S_1$. When shutter 36 is in a closed position mask 40 is disposed slightly out of phase with mask 32 so that light passing through mask 32 is not transmitted to mask 40. Opening of shutter 36 is accomplished by a slight movement of mask 40, bringing the pinholes of mask 40 into alignment with those of mask 32, and thereby permitting the passage of light to film 34.

According to an alternative embodiment of the invention, controlled distortion correction for accurate reproduction cameras may be accomplished by introducing slight distortions into the periodicity of the lenslets forming array 30, particularly along the peripheral edges of the lenslet array. The precise amount of distortion introduced is designed to compensate for other known spurious distortions introduced by the remainder of the optical system or present in an original being photographed. Similarly, distortions in the periodicity of the pinholes in mask 32 may be employed for distortion correction.

Figure 3:
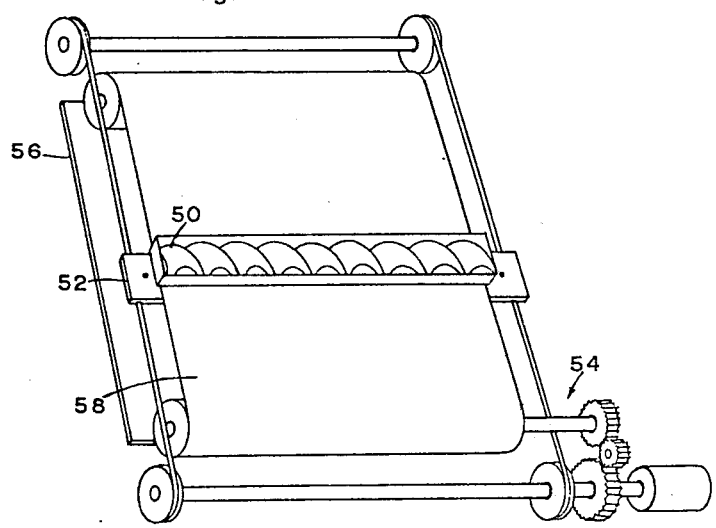
FIG. 3 is a pictorial view of a scanning camera constructed and operated in accordance with an embodiment of the present invention.

Referring now to FIG. 3 there is shown a camera employing a linear array of lenslets 50 and a corresponding linear pinhole mask 52. Lenslet array 50 may conveniently have a periodicity of $P_x$ equal to 0.2 mm and pinhole array mask 52 may have a pinhole periodicity of $P_y$ which is slightly greater than 0.2 mm and is calculated based on the number of lenslets in the linear array as set forth hereinabove.

Drive means 54 are provided for moving lenslet array 50 and pinhole mask 52 at independently selectable velocities with respect to photographic film 56 disposed behind mask 52. A movable curtain 58 prevents light not passing through the lenslet array from reaching film 56. Film 56 remains static during exposure and the lenslet array is moved transversely thereto at a velocity $V_1$ while the pinhole array is moved at a velocity $V_2$. The ratio of velocities $V_1$ and $V_2$ is selected to be substantially equal to the ratio of $P_x$ and $P_y$ thus providing an image on the film equivalent to that produced by the camera in FIG. 2.

According to an alternative embodiment of the invention pinhole array mask 52 and lenslet array 50 may be maintained fixed while film 56 and the object being viewed move. Such a camera may be useful for continuous copying or as a finish line racetrack camera, where the transverse position of an image on the film is a function of the particular moment in time when the exposure was made.

In the embodiment of FIG. 1, each lenslet in the two dimensional lenslet array images an entire miniature version of the desired output image. Thus, the size of the pinholes in the pinhole-array are very small and the positioning tolerances on the pinholes are very tight. Also, from a practical point of view, the quality of imagery from each lenslet may be difficult to achieve when constrained by the cost limitations of a consumer oriented device. Such low-cost practical implementation difficulties may be overcome by means of the alternative embodiment illustrated in FIG. 4. While this embodiment contains more parts than the embodiment of FIG. 1, it offers a great reduction in the accuracy required in actually producing a device that would provide good quality images, thus resulting in great cost savings.

Figure 4:
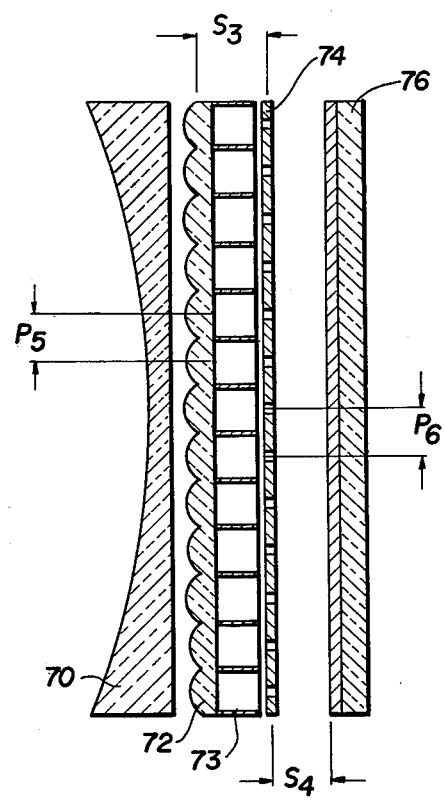
FIG. 4 is a schematic cross-sectional view of a further embodiment of the present invention.

In FIG. 4 a large simple lens 70, having a focal length $f_o$ is placed in front of a lenslet array 72 similar to the lenslet array 10 shown in FIG. 1. Lenslet array 72 has a periodicity $P_5$ which, again, is not substantially larger than the smallest size resolvable by the unaided human eye, typically 0.16 to 0.33 mm, preferably about 0.2 mm. Lenslet array 72 may be practically adjacent to (almost touching) lens 70, and each lenslet has a focal length $f_1$.

A pinhole array, or aperture mask, 74 is placed at a distance $S_3$ from the lenslet array 72. The periodicity of the pinholes is $P_6$ and each pinhole is of size d and may be circular in shape. In this embodiment the periodicity $P_6$ of the pinholes is identical to the periodicity $P_5$ of the lenslets. Photographic film 76 is disposed with its light sensitive surface at a distance $S_4$ from the pinhole array 74.

It is to be understood that FIG. 4 is a cross-section through two dimensional arrays 72 and 74, lens 70 and recording surface 76. While not essential to the operation of this embodiment, in the simplest and preferred mode periodicities $P_5$ and $P_6$ are the same in both directions.

Since periodicities $P_5$ and $P_6$ of the lenslets and the apertures are the same, the device of FIG. 4, without lens 70, will have an $F_{eff}=\infty$. With conventional lenses an infinite focal length is meaningless. However, an optical imaging system in accordance with the present invention with an infinite effective focal length behaves as a telecentric system giving 1 to 1 image magnification regardless of object location and having a very large depth of field. Such a telecentric system is discussed in the paper "Imaging by Sampling" incorporated by reference hereinabove. This telecentric system will achieve optimum focus for an object at a distance $S_o$ in front of the lenslet array. Assuming that the focal length $f_o$ of the lens 70 is given by $f_o=-S_o$, this negative lens will create a virtual image at a distance $S_o$ in front of it, of any object which is far (relative to $S_o$) from it. When this lens 70 is placed in front of the telecentric system 72, 74, 76, the telecentric system would use the virtual image from the lens 70 as its "object" and would create a copy of it on the recording surface 76. Thus, the entire device would behave like a lens giving a real, upright image of the same size as that of a conventional lens of focal length F where $F=-f_o$.

In this embodiment the separation $S_3$ between lenslet array 72 and pinhole array 74 is related to the focal length $f_1$ of each individual lenslet by the following equation:

$$S_3=(f_1 \cdot S_o)/(S_o-f_1).$$

as $S_o$ is generally much larger than $f_1$, $f_1$ may be taken as a good approximation to $S_3$. In view of this fact, and since $f_1$ is typically far smaller than $-f_o$ and as $S_4$ is usually equal to or somewhat smaller than $S_3$ (as discussed hereinbove with respect to $S_1$ and $S_2$), the entire thickness of the package is much smaller than its effective focal length, although it is somewhat thicker than the device of the embodiment of FIG. 1.

Because each lenslet in the array is essentially looking forward and because the periodicity of the two arrays 72 and 74 are equal ($P_5=P_6$), only the very center of each image is actually being picked up by the corresponding pinhole. The assignment of the right portion of each image to the corresponding pinhole is actually done by the lens 70. Thus, the quality of the rest of each miniature image, other than the center portion being picked up by the pinhole, is unimportant and lenses of relatively poor off-axis definition can be used in the lenslet array 72. Similarly, focal lengths $f_1$, relatively longer than those used in the embodiment of FIG. 1 can be used. These features cause the lenslet array to be easier and less costly to design and manufacture.

Since the actual focal length $f_1$ of each lenslet may be larger than those used in the embodiment of FIG. 1, the diameter d of each pinhole may also be correspondingly larger. Such larger pinholes are easier to produce and positioning tolerance is more confortable.

In order to avoid any overlap between the images produced by each lenslet it may be desirable to insert walls 73 between lenslet array 72 and aperture mask 74. Such opaque, intersecting walls or septa form squares, in cross-section, each having an area equal to its corresponding lenslet. While such walls 73 are desirable, they may be eliminated by proper design of the lenslets to avoid such image overlap.

Many variations of the details of the embodiment shown in FIG. 4 are possible. For example, lens 70 may be positive. In that case an upside-down image will appear on the recording surface 76. The equation for $S_3$ given above will still be valid except that $S_o$ is now negative.

A "Fresnel" type thin lens may be used rather than a conventional lens for lens 70. This would make the device lighter and possibly thinner. However, the possibility of having moire fringes between the groove period of the Fresnel lens and the period of the lenslet array 72 must be taken into account when designing the device.

A toroidal surface lens, or one having two cylindrical surfaces so that the focal length is, for example, positive in one dimension and negative in the other, may be used for lens 70. For this case $S_3$ will be set to $S_3=f_1$. The large depth of field of the telecentric part of the device will be used to bring both dimensions into focus. This case is of interest when a mirror reversed image is desired on the recording surface 76, as is necessary with some instant developing photographic films.

The addition of the lens 70 of the configuration of FIG. 4 can be combined with the scanning configuration of FIG. 3. In this case arrays 72 and 74 are one dimensional and lens 70 may be a thin cylindrical lens.

It will further be clear to those skilled in the art that the present invention may be constructed and operated in a wide variety of differing embodiments all within the scope of the present invention. For example, intersecting walls or septa such as those illustrated as walls 73 and discussed with respect to FIG. 4 may be used in the other embodiments of the present invention. Furthermore, while the use of photographic film or other photosensitive material has been described hereinabove, other image-recording means may be used such as an electronic image pick-up. Other variations on the configurations used in the present invention will also become obvious for use with specific applications. The invention as set forth in the appended claims is therefore not to be considered limited to what is shown in the drawings and described in the specification.

What is claimed is:

1. Optical apparatus for producing a relatively large image of an object with a relatively small distance between the front of the apparatus and an image surface, comprising:

lens means for producing a plurality of images, said lens means including a surface distribution of lenslets in a predetermined arrangement disposed intermediate an object and an image surface, each of said lenslets being a size not substantially larger than the smallest size resolvable by the unaided human eye;

sampling means disposed intermediate said plurality of lenslets and said image surface for defining a plurality of discrete light transmission paths, said paths being arranged such that each path transmits light representing a different portion of each image of said plurality of images to said image surface, whereby the sum of the contributions of each of said light paths produces a completed image on said image surface; and image surface means for holding means for recording an image at said image surface, said image surface means being disposed as to maintain the means for recording an image at a sufficient distance from said sampling means to allow each said light transmission paths to be distributed onto an area approximately equal to the area of a single lenslet.

2. An optical apparatus in accordance with claim 1 wherein said surface distribution of lenslets comprises a planar array of substantially identical lenslets and said image surface means holds said means for recording an image in a parallel relationship to said planar array.

3. An optical apparatus in accordance with claim 1 wherein said sampling means comprises an aperture mask having formed thereon a pinhole array permitting light representing portions of the image from said lenslets to pass through said mask at discrete positions thereon.

4. An optical apparatus in accordance with claim 3 wherein said lens means consists of a planar array of substantially identical lenslets, said aperture mask is generally planar and disposed parallel to said planar lenslet array, and said image surface means holds said means for recording an image in a parallel relationship to said planar lenslet array, and wherein the periodicity of the pinholes in said pinhole array is sufficiently larger than the periodicity of the lenslets in said lenslet array to permit light representing different portions of the image from each lenslet to pass through said mask.

5. An optical apparatus in accordance with claim 4 wherein each of said lenslets has substantially the same focal length and said aperture mask is separated from said lenslet array by a distance substantially equal to said focal length.

6. An optical apparatus in accordance with claim 5 wherein said image surface means holds said means for recording an image at a distance from said aperture mask which is substantially equal to said focal length.

7. An optical apparatus in accordance with claim 1 wherein the periodicity of the lenslets in one direction of said lenslet array is equal to the periodicity of the lenslets in the direction perpendicular thereto.

8. An optical apparatus in accordance with claim 7 wherein said periodicity is from about 0.16 to about 0.33 mm.

9. An optical apparatus in accordance with claim 8 wherein said periodicity is about 0.2 mm.

10. An optical apparatus in accordance with claim 1 further including shutter means for selectively permitting or not permitting said light transmission paths to reach the means for recording an image held by said image surface means.

11. An optical apparatus in accordance with claim 1 wherein said image surface means is for holding photosensitive material at said image surface.

12. An optical apparatus in accordance with claim 4 wherein the width of each of said pinholes is substantially the same proportion to the width of each of said lenslets as the width of each of said lenslets is to the width of the entire lenslet array.

13. An optical apparatus in accordance with claim 1 wherein said surface distribution of lenslets comprises a single row of lenslets and wherein said sampling means comprises:

an aperture mask having formed therein a single row of pinholes parallel to said single row of lenslets, moving means for moving said row of lenslets and said row of pinholes with respect to the means for recording an image held by said image surface means, in a direction transverse to the axis of said lenslet and pinhole rows, and screen means for blocking the passage of light to the means for recording an image held by said image surface means except insofar as light passes to said lenslets.

14. An optical apparatus in accordance with claim 13 wherein the periodicity of the pinholes in said row of pinholes is sufficiently greater than the periodicity of the lenslets in said row of lenslets to permit light representing different portions of the image from each lenslet to pass through said mask, and wherein said moving means comprises a lenslet moving means for moving said row of lenslets at a first velocity and a pinhole moving means for moving said row of pinholes at a second velocity slightly greater than said first velocity and related to said first velocity by a ratio substantially identical to the ratio between the periodicity of said pinholes in said row of pinholes and the periodicity of said lenslets in said row of lenslets, whereby relative movement of said row of lenslets and said row of pinholes with respect to the means for recording an image held by said image surface means produces a scanned image thereon.

15. An optical apparatus in accordance with claim 3 wherein said aperture mask has one pinhole aligned with the axis of each of said lenslets and wherein said lens means further includes focusing means disposed between said distribution of lenslets and the object for directing different portions of the light from said object onto each of said lenslets.

16. An optical apparatus in accordance with claim 15 wherein said focusing means is a single negative lens disposed adjacent to said distribution of lenslets.

17. An optical apparatus in accordance with claim 15 further including preventative means for preventing overlap on said aperture mask of the images from each of said lenslets.

18. An optical apparatus in accordance with claim 17 wherein said preventative means comprises walls extending substantially from the borders of each lenslet in said distribution of lenslets substantially to said aperture mask.

19. An optical apparatus in accordance with claim 3 further including preventative means for preventing overlap on said aperture mask of the images from each of said lenslets.

20. An optical apparatus in accordance with claim 19 wherein said preventative means comprises walls extending substantially from the borders of each lenslet in said distribution of lenslets substantially to said aperture mask.

* * * * *